June 27, 1950
J. B. ALEXANDER
2,512,591
METHOD OF MAKING FOOD PRODUCT
Filed Sept. 29, 1947
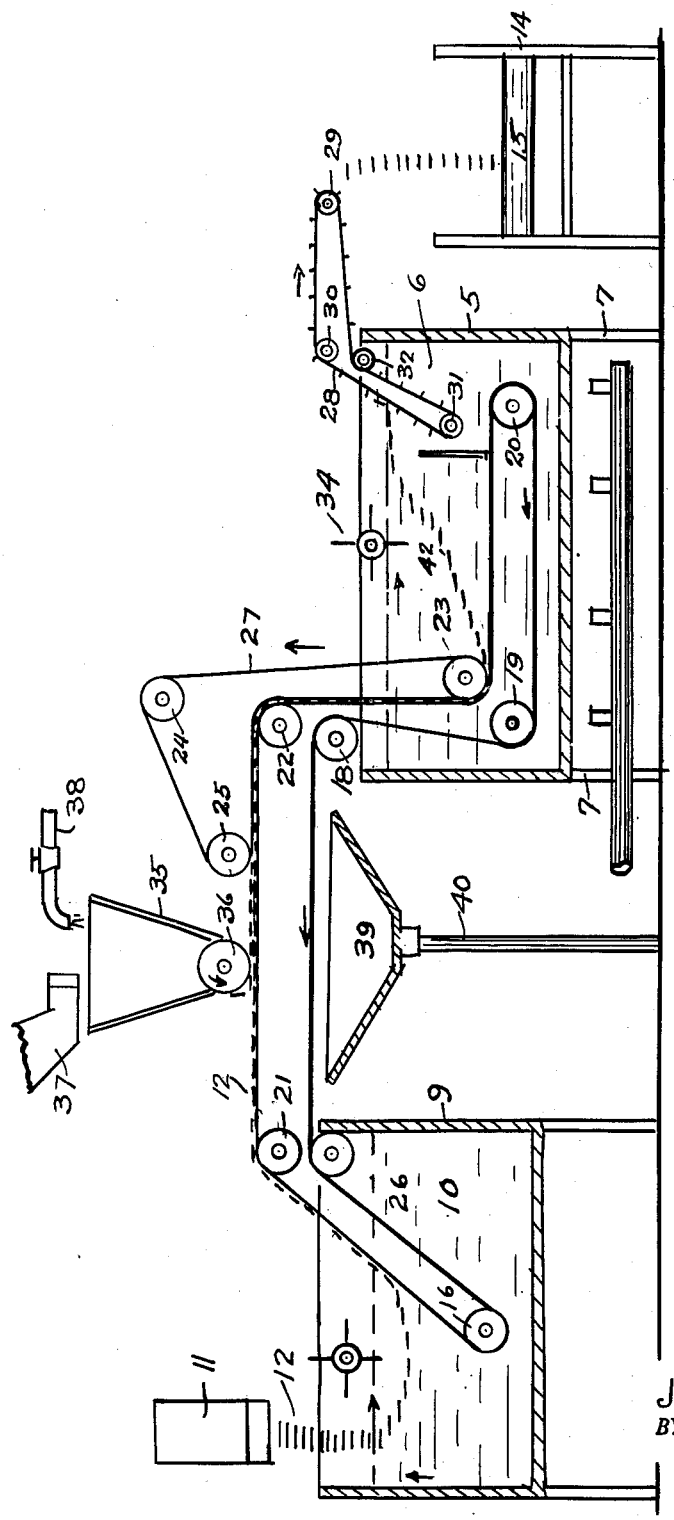
Fig. 1
Fig. 3
Fig. 2
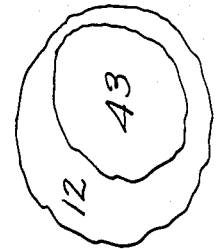
INVENTOR.
JAMES B. ALEXANDER
BY
Martin E. Anderson
ATTORNEY Patented June 27, 1950

2,512,591

UNITED STATES PATENT OFFICE 2,512,591

METHOD OF MAKING FOOD PRODUCTS

James B. Alexander, Denver, Colo.

Application September 29, 1947, Serial No. 776,790

2 Claims. (Cl. 99—100)

This invention relates to improvements in food products and methods for making the same.

The food product that is sold under the name of "potato chips" has met with widespread acceptance and is made and sold in large quantities. However, there are other vegetables that are as well suited for processing by hot fat dehydration as potatoes, among which the most important are carrots. Although carrot chips can be sliced and dehydrated or cooked in the same manner as potato chips, the product thus obtained lacks certain properties that are present in the ordinary potato chips.

It has been found that if slices of potato have superposed thereon slices of carrot and the combined potato and carrot slices are subjected to a dehydrating action or cooking in a heated liquid fat, a product is obtained that possesses highly desirable properties, such as characteristic flavor, better keeping qualities, a novel and agreeable appearance, and a pleasant taste. In addition to this, the carrots supply certain valuable vitamins.

This invention, briefly described, consists in slicing potatoes in a manner now common, distributing the slices on a screen, depositing slices of raw carrot on the potato slices, subjecting the assembly to a slight pressure to effect a close contact between the potato and carrot slices and then depositing the assembly in fat heated to the temperature usually employed with the processing of potato chips alone. The resultant product is permitted to drain leaving a dry, crisp food product composed of potato and carrot chips. It has been found that when a carrot chip is placed on a freshly cut raw potato chip and forced into close contact therewith before they are subjected to the frying or dehydrating action, they will adhere to each other forming a product of unique appearance and flavor.

The potatoes and the carrots may, of course, be sliced and assembled by hand, but where quantity production is to be practiced, a suitable machine is necessary and on the accompanying drawing a machine has been illustrated as an example.

In the drawing:

Figure 1 is a side elevational view showing one form of apparatus for carrying out the invention;

Figure 2 is a top plan view showing a potato chip with a carrot chip resting thereon; and Figure 3 shows a side elevation of the food product after it has been processed.

Referring now to the drawing, reference numeral 5 represents a cooking vat that contains a quantity of suitable oil 6. This is spaced from the floor by means of suitable supports 7 and underneath the bottom are a number of gas burners 8, by means of which the liquid fat 6 is maintained at a proper temperature.

Reference numeral 9 designates a tank of some suitable construction that contains a quantity of water 10. Positioned above tank 10 is a conventional potato slicer 11. Reference numeral 12 indicates potato chips that are dropping into the water in tank 10. A paddle wheel 13 is rotated in a counterclockwise direction with the paddles a short distance below the top of the liquid, as indicated. Reference numeral 14 designates a conveyor having a conveyor belt 15.

A number of rollers which have been designated by reference numerals 16, 17, 18, 19, 20, 21, 22, 23, 24 and 25 are mounted for rotation about axes perpendicular to the plane of the drawing. A conveyor screen 26 encircles the end rollers 16 and 20 and passes over rollers 17, 18, 19, 21 and 22 and 23. Another conveyor screen 27 passes around rollers 23, 24, 25 and about roller 22. One of these rollers is driven from a suitable motor in such a direction that the conveyor screens move in the direction of the arrows. It will be observed that the section of screen between rollers 22 and 25 and between rollers 22 and 23 are double for a purpose which will later appear. A conveyor 28 is mounted at the righthand end of the cooking vat, when viewed as in Figure 1, and passes around and about rollers 29, 30, 31 and 32. This conveyor belt moves in the direction of the arrow. A partition 33 is positioned in vat 5 in the relationship to the conveyor 21 shown in the drawing. A paddle wheel 34 is mounted at the upper part of vat 5 and rotated in a counterclockwise direction for the purpose which will later be explained. Positioned above the straight section of screen connecting rollers 21 and 22 is a hopper 35 having its bottom closed by roller 36. Above this hopper is a conventional slicing machine 37 that, in this instance, is employed for slicing carrots, while the slicer designated by reference numeral 11 is used for slicing potatoes.

A stream of water from pipe 38 flows into hopper 35 and after passing through the screen conveyors flows into pan 39 and thence through a pipe 40 to a waste pipe or to a tank from which it may be pumped for reuse.

Let us now consider a case in which the apparatus shown in the drawing is in operation, the conveyor belt moving in the direction of the arrows. The section of conveyor belt between rollers 16 and 21 will gather potato chips from the liquid 10 in tank 9, the chips being projected towards the conveyor by means of paddle wheel 13. Since hopper 35 contains slices or chips of carrots and since water flows downwardly, carrot chips will be deposited on the rotating cylinder 36 and carried down and deposited on top of the potato chips which have been designated by reference numeral 12. A bar 41 serves to remove the carrot slices from the rotating cylinder 36 and these will therefore be deposited on top of the potato chips. The double layer of chips will now pass between conveyor belts 26 and 27 and be carried towards the roller 22. While in this position, and while turning around roller 22, the two slices will be pressed into close contact and will be held in close contact until they have passed roller 23. During a portion of this passage, they will pass through the hot fat in the cooking vat and will emerge in partly processed state. The application of heat while they are held in contact will serve to weld the two slices to such an extent that they will continue as a unit. In the drawing the slices, after they have been liberated in the hot processing liquid, have been designated by reference numeral 42. Paddle wheel 34 serves to move the compound slices 42 into contact with conveyor belt 28 which then removes them from the vat and deposits them on a conveyor 15 that permits the chips to drain and from which they are deposited in a suitable container. After the chips have been released from between conveyors 26 and 27, they will be subjected to the dehydrating and frying action of the hot liquid 6 and will curl in the manner of ordinary potato chips. In Figure 2, a potato chip 12 has been shown and supported thereon is a slice or chip of carrot, which has been designated by reference numeral 43.

In Figure 3, the fully processed food product has been shown in end elevation for the purpose of indicating its curved shape.

It has been found that slices of potato and carrot, when first pressed together and then subjected to heat treatment, will adhere to such an extent that they will thereafter constitute a single unit.

Having described the invention what is claimed as new is:

1. The method of producing a food product which comprises, slicing potatoes, depositing slices of carrot on the potato slices, exerting pressure on the slices to force them into contact, and immersing the slices in a hot cooking fluid while held in assembled relation, whereby adherence is effected.

2. The method of producing a food product which comprises slicing potatoes, depositing slices of carrot on the potato slices, exerting pressure on the slices to force them into contact, immersing the slices in a hot cooking fluid while held in assembled relation, whereby adherence is effected, and then releasing the assembled slices to complete the dehydrating while freely suspended in the cooking fluid.

JAMES B. ALEXANDER.

REFERENCES CITED

The following references are of record in the file of this patent:

UNITED STATES PATENTS

| Number | Name | Date |
| --- | --- | --- |
| Re. 20,040 | Romney | July 21, 1936 |
| 1,806,302 | Magrill | May 19, 1931 |
| 1,868,183 | Sweet | July 19, 1932 |
| 1,933,557 | Kalvin | Nov. 7, 1933 |
| 2,225,068 | Marriott | Dec. 17, 1940 |
| 2,244,145 | Erickson | June 3, 1941 |
| 2,286,644 | Pringle et al. | June 16, 1942 |
| 2,350,179 | Marvin | May 30, 1944 |
| 2,352,447 | Powers et al. | June 27, 1944 |